Jan. 15, 1946.   D. G. FAWKES   2,392,980
FLUID MOTOR STROKE SHIFTER
Filed Dec. 21, 1942   2 Sheets-Sheet 1

Inventor:
Donald G. Fawkes:
By: Joseph O. Lange
Atty.

Jan. 15, 1946. D. G. FAWKES 2,392,980
FLUID MOTOR STROKE SHIFTER
Filed Dec. 21, 1942 2 Sheets-Sheet 2

Inventor:
Donald G. Fawkes:
By Joseph O. Lange Atty.

Patented Jan. 15, 1946

2,392,980

UNITED STATES PATENT OFFICE 2,392,980

FLUID MOTOR STROKE SHIFTER

Donald G. Fawkes, Chicago, Ill., assignor to Crane Co., Chicago, Ill., a corporation of Illinois Application December 21, 1942, Serial No. 469,765

5 Claims. (Cl. 121—119)

This invention relates to a fluid motor device and more particularly is concerned with a new and improved fluid motor stroke shifter or stroke varying means useful in connection with fluid motor control systems. It has for one of its principal objects a type of flexible control in which by means of a differential piston the fluid motor is enabled to run in two directions and also is capable of having its length of stroke automatically shifted. The latter accomplishments heretofore have been considered impossible because of the fact that the ordinary stroke shifting piston only permitted fluid motor rotation in one direction.

A further important object of this invention is to provide a fluid motor or pump stroke shifter which automatically varies the fluid motor or pump displacement in either of two directions whereby the amount of fluid motor torque output varies in direct relation with the output of torque required.

Another important object of this invention lies in the provision of a fluid motor or pump stroke shifter of the type hereinafter described and having a double piston which permits the fluid pump or motor to operate in either a clockwise or counter-clockwise direction without bypassing any of the operating fluid.

The novel stroke shifting device illustrative of the instant invention and as applied to the valve operator systems is set forth in the copending application of Fawkes, Fennema and deCraene entitled Valve operator identified as Serial No. 468,864, filed December 11, 1942, now abandoned, and in my copending application entitled Valve operating system, identified as Serial No. 474,897, filed February 5, 1943. Variable displacement fluid motors and fluid pumps have been used previously; however, currently used stroke shifters have not been capable of performing in conjunction with a reversible fluid motor or pump primarily because the conduits carrying the operating fluid to the stroke shifting mechanisms could not be attached to both sides of the fluid motor or pump without bypassing the inlet and the outlet of the motor or pump and thereby completely eliminate motor or pump operation.

It is therefore an object of this invention to overcome such prior deficiencies as referred to and as applied to the stroke shifter in relation to a fluid pump or motor.

Other objects will become apparent from the disclosures in the following specification and accompanying drawings, in which Fig. 1 shows a fluid motor stroke shifter illustrative of my invention and fixedly mounted relative to a fluid motor.

Figure 1:
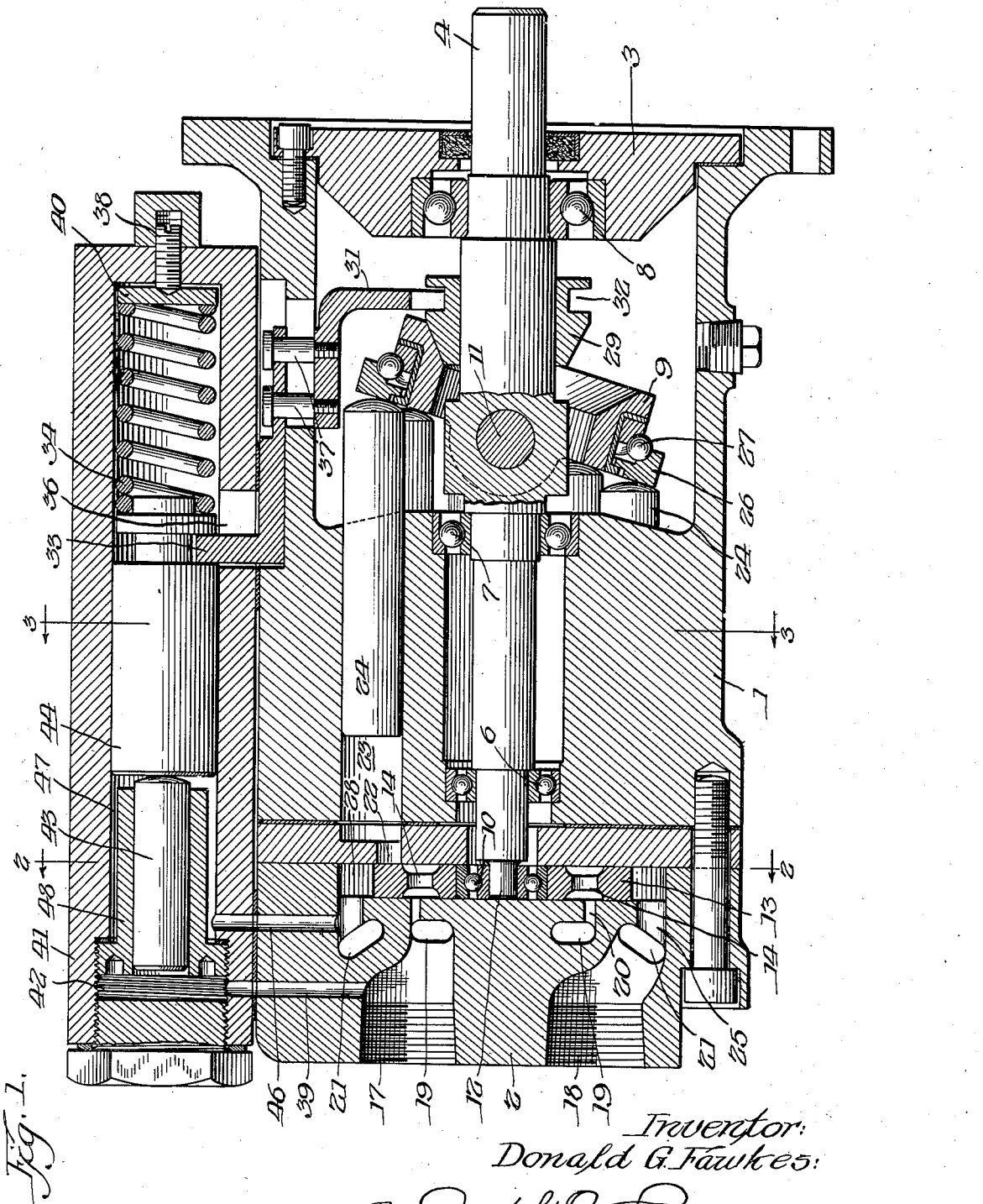
Figure 2:
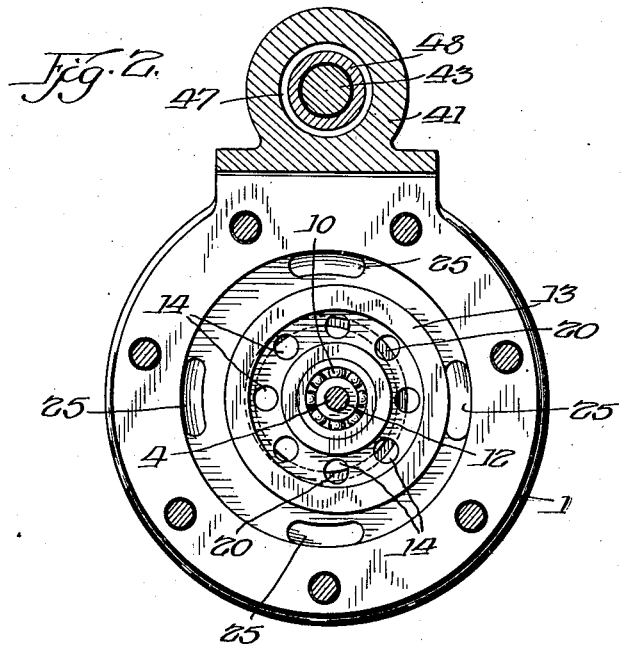
Fig. 2 is a sectional view taken on the line 2—2 of Fig. 1.
Figure 3:
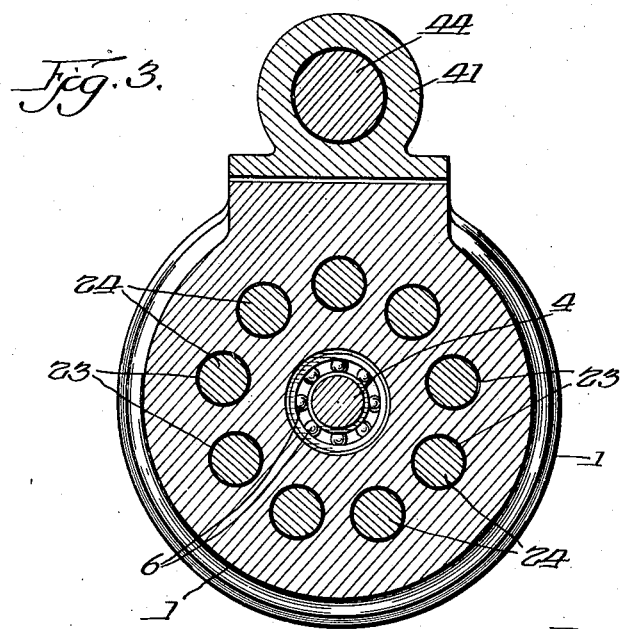
Fig. 3 is a sectional view taken on the line 3—3 of Fig. 1.

The stroke shifting mechanism of this invention is applied either to pumps or to fluid motors such as the one illustrated in the drawings and which is substantially a standard type of wobble-plate motor. The reference numeral 1 therefore indicates generally the cylindrical housing for the fluid motor and is supplied with the end caps 2 and 3 for each end thereof. The motor shaft 4 is mounted within the housing 1 journaled in bearings 6, 7, 8 and 10 and, as indicated, projects through the end cap 3. A wobble-plate 9 is pivotally attached in non-rotatable relation with the shaft 4 by means of the pin 11. Positioned on the end of the shaft 4 the eccentrically mounted stud 12 is provided upon which is positioned the bearing 10, surrounded by the valve plate 13, the latter member having the apertures 14.

In actual operation, fluid under pressure from any source (not shown) may enter within the end cap 2 through either of the ports 17 or 18. Since the fluid motor herein described is of the reversing type, it will be understood that when fluid under pressure is admitted to one or the other of the ports 17 or 18, the motor will therefore rotate in either a clockwise or a counter-clockwise direction, depending upon the port of entry of pressure. Within the end cap 2, two annular passages 19 and 21 are provided with which are associated the ports 17 and 18 respectively, as indicated. Let it now be assumed that fluid under pressure is entering the port 17 whereupon it will enter the annular passage 19 and its extended portion 20 and as the valve plate 13 moves on its axis of gyration about the eccentric stud 12 on the shaft 4, the openings 14 in the valve plate 13 are alternately aligned and positioned out of alignment with the annular extended portion 20 of the passage 19. Thus, as shown in the drawings, fluid under pressure enters the valve apertures 14. As the valve plate 13 moves to predetermined position the valve passageways 14 become aligned with the ports 22 leading to the piston cylinders 23 in which the reciprocably movable pistons 24 are mounted. It should be noted that the fluid motor consists of a plurality of cylinders 23 (in this case nine) and the pistons 24 are positioned circumferentially about the shaft 4 within the housing 1. As the fluid under pressure enters the cylinders 23 it forces the pistons 24 against a non-rotating wobbler 9 and contacts at the portion 26. As indicated, the portion 26 of the wobbler 9 is mounted on a ball bearing race 27. The angle at which the wobbler 9 is inclined provides for the thrust of the piston to move horizontally, the resultant force thereof is transmitted through the ball bearings 27 to the wobble plate 9 on the shaft 4 and thereby imparts a rotating action to the latter member. On the return stroke of the pistons 24 the fluid passes over the top of the downwardly gyrating valve plate 13 to enter the chamber 28 and thence passes to the annular passageway 21 via the ports 25, exiting through the port 18. Therefore, if the fluid under pressure enters the port 18 and exits from the port 17, it is apparent the rotation of the shaft 4 would be in the opposite direction. As previously stated, the wobble plate 9 is pinned to the shaft 4 at 11 and is therefore not capable of longitudinal movement or rotative movement with respect to the shaft 4, but it does impart variable inclination with relation to the shaft 4 as it pivots about the pin 11. A sleeve cam 29 surrounds the shaft 4 and is positioned between the wobble plate 9 and the end cap 3 of the housing 1 of the motor. The member 29 thus controls the tilting of the wobble plate 9 and with the sleeve in its normal position, as shown, the motor is operating at minimum displacement. A fork-like bracket 31 engages an annular groove 32 of the sleeve cam 29. This bracket 31 is connected to an upward extension 33, the latter member extending into the stroke shifting mechanism and restraining the motor to the extent of permitting only minimum displacement by means of the spring 34. The latter member maintains the stroke shifting bracket combination 33 and 31 in its furthermost position to the left within the slot 36. The upper and lower portions of the stroke shifting brackets, namely 33 and 31, are held rigidly together by means of the shouldered bolts 37. The spring 34 has its compression adjustable by means of the set screw 38 acting upon the pressure plate 40.

Inasmuch as this is a variable displacement fluid motor, it will be seen that when greater resistance is offered to the rotation of the shaft 4, the pressure of the operating fluid will increase, and if the entering fluid port is 17, a portion of the fluid under pressure which is gradually increasing now that the resistance to the shaft 4 is increasing, will be diverted through the passageway 39 and will enter the stroke shifting cylinder 41 in the chamber 42 immediately behind the smaller diameter piston 43. As soon as the fluid under pressure in the chamber 42 has increased to a point where it exceeds the compression load exerted by the spring 34, the piston 43 will then advance towards the right of the stroke shifting cylinder 41, forcing the larger diameter piston 44 and the combined stroke shifting bracket 33 and 31, thereby resulting in a movement of the sleeve 29 in a similar direction towards the right so that the inclination of the wobble plate 9 is increased. This permits longer piston stroke for the piston 24 and thereby provides for increased motor displacement.

Now, when fluid is admitted to the port 18 rather than through the port 17, the fluid under pressure will be diverted through the passageway 46 which is in communication with the circumferential chamber 47 about the sleeve 48 which surrounds the smaller diameter piston 43. Therefore fluid under pressure from the port 18 will have access to the large diameter piston 44 and will similarly cause a movement of the stroke shifting bracket 33 and 31 with a resultant increase in fluid displacement for the motor.

Heretofore a straight, continuous diameter piston has been used and has had limited motor rotation in one direction simply because the two conduits leading to a common chamber behind such straight diameter or continuous piston created a bypassing of the supply and the exhaust fluid and thus none of the supply fluid reached the motor proper.

Thus numerous changes may be made and the details of construction varied throughout a wide range without departing from the principles of the construction set forth in the following claims.

I claim:

1. A stroke varying mechanism comprising a housing, a motor shaft mounted in the housing, a wobble plate pivotally mounted in non-rotatable relation to the said motor shaft, a ported valve plate eccentrically positioned relative to the said motor shaft and rotatable therewith, closure means at one end of the said housing having a plurality of inlet passages through which fluid may enter to effect rotation of said shaft in either a clockwise or counterclockwise direction and having additional passages associated with said first named passages, the valve plate having openings in communication with a portion of the said additional passages upon predetermined rotation thereof, reciprocably movable pistons actuated by fluid flowing from said passages upon rotation of the said valve plate to tilt the said wobble plate and thereby rotate the said motor shaft, fluid exhaust means for the said stroke varying mechanism, each of said pistons having communication with the instant inlet passage upon predetermined rotation of the said valve plate, a sleeve cam member cooperating with the said motor shaft, superposed pistons cooperating with the said sleeve cam member, a bifurcated bracket engageable with the said sleeve cam member and supported by the said superposed pistons and actuated by the fluid within the said passages whereby upon the occurrence of increased fluid pressure the said sleeve cam member is moved to provide for greater inclination of the said wobble plate and increased motor displacement for the said pistons.

2. A stroke varying mechanism comprising a housing, a motor shaft mounted in the housing, a wobble plate pivotally mounted in non-rotatable relation to the said motor shaft, a ported valve plate eccentrically positioned relative to the said motor shaft and rotatable therewith, a cap member at one end of the said housing having a plurality of passages through which fluid may enter to effect rotation of said shaft in either a clockwise or counterclockwise direction and having a pair of passages associated with said first named passages, the valve plate having openings in communication with a portion of the said passages upon predetermined rotation thereof, reciprocably movable pistons consecutively actuated by fluid flowing from said passages upon rotation of the said valve plate to tilt the said wobble plate to thereby rotate the said motor shaft the said housing having a cylinder with a connecting aperture therebetween, each piston being in instant communication with one inlet passage upon predetermined movement of the valve plate, a sleeve cam cooperating with the said motor shaft, a pressure actuated bracket engageable with the said sleeve cam and movable within the said cylinder aperture to cooperate with the said inlet passages to vary the inclination of the said wobble plate upon the occurrence of increased resistance to the motion of the said motor shaft, means for exhausting fluid from the said mechanism.

3. A stroke varying mechanism comprising a housing, a motor shaft mounted in the housing, a wobble plate pivotally mounted in non-rotatable relation to the said motor shaft, a ported valve plate eccentrically positioned relative to the said motor shaft and rotatable therewith, the said housing having a cylinder with a connecting aperture therebetween, a cap member at one end of the said housing having a plurality of inlet passages through which fluid may enter to effect rotation of said shaft in either a clockwise or counterclockwise direction and having a pair of passages associated with said first named passages, the valve plate having openings in communication with a portion of the said passages upon predetermined rotation thereof, reciprocably movable pistons consecutively actuated by fluid flowing from said passages upon rotation of the said valve plate to tilt the said wobble plate to thereby rotate the said motor shaft, each of the pistons being in communication with one of the fluid supply passages upon predetermined rotation of the valve plate, a sleeve cam cooperating with the said motor shaft, an angularly extending bracket cooperating with the said sleeve cam and the said passages whereby increased motor displacement for the said pistons is provided, ported means for exhausting fluid from said mechanism, independent resiliently mounted piston means interposed between the said passages and the said bracket to effect movement of the said bracket and wobble plate upon diversion of a portion of fluid flow against said resiliently mounted piston means, the said bracket being movable within the connecting aperture between the said housing and cylinder.

4. A stroke varying mechanism comprising a housing, a motor shaft mounted in the housing, a wobble plate pivotally mounted in non-rotatable relation to the said motor shaft, a ported valve plate eccentrically positioned relative to the said motor shaft and rotatable therewith, closure means at an end portion of the said housing having a plurality of inlet passages through which fluid may enter to effect rotation of said shaft in either a clockwise or counterclockwise direction and having a plurality of passages associated with said first named passages, fluid exhaust means for the said stroke varying mechanism, the valve plate having openings in communication with a portion of the said latter passages upon predetermined rotation thereof, reciprocably movable pistons actuated by fluid flowing from said passages upon rotation of the said valve plate to tilt the said wobble plate to thereby rotate the said motor shaft, a sleeve cam cooperating with the said motor shaft, the said housing having a side cylinder portion, superposed contacting pistons of unequal diameter in said side cylinder portion each of which is in direct communication with the instant inlet passage, a bracket engageable with said sleeve and actuated by at least one of said latter superposed pistons whereby the said wobble plate is provided with increased inclination to permit greater displacement of the said first named pistons.

5. A stroke varying mechanism comprising a housing, a motor shaft mounted in the housing, a wobble plate pivotally mounted in non-rotatable relation to the said motor shaft, a ported valve plate eccentrically positioned relative to the said motor shaft and rotatable therewith, closure means at one end of the said housing having a plurality of inlet passages through which fluid may enter predeterminately to effect rotation of said shaft in either a clockwise or counterclockwise direction and having additional passages associated with said first named passages, the valve plate having openings in communication with a portion of the said passages upon predetermined rotation thereof, passage means for exhausting fluid from the said stroke varying mechanism, reciprocably movable pistons actuated by fluid flowing from said passages upon rotation of the said valve plate to tilt the said wobble plate and thereby rotate the said motor shaft, a sleeve cam cooperating with the said motor shaft, a bracket therefor, pressure actuated means between the inlet passages and the said bracket, each of said pressure actuated means having direct communication with the instant inlet passage upon suitable rotation of said valve plate, the said sleeve cam being positioned between the said wobble plate and an end portion of the said housing, resilient means cooperating with said bracket and opposing the movement of the said last named pressure actuated means whereby the inclination of the said wobble plate becomes greater as the resistance of the said motor shaft due to heavier loads is increased.

DONALD G. FAWKES.